United States Patent
Horie

(10) Patent No.: US 10,641,654 B2
(45) Date of Patent: May 5, 2020

(54) OPTICAL MEASURING APPARATUS AND ADAPTER FOR OPTICAL MEASURING APPARATUS

(71) Applicant: OMRON Corporation, Kyoto (JP)

(72) Inventor: Masaru Horie, Kusatsu (JP)

(73) Assignee: OMRON Corporation, Kyoto (JP)

( * ) Notice: Subject to any disclaimer, the term of this patent is extended or adjusted under 35 U.S.C. 154(b) by 232 days.

(21) Appl. No.: 15/839,872

(22) Filed: Dec. 13, 2017

(65) Prior Publication Data

US 2018/0259392 A1  Sep. 13, 2018

(30) Foreign Application Priority Data

Mar. 13, 2017 (JP) ................. 2017-047078

(51) Int. Cl.
| | | |
|---|---|---|
| *G01J 1/44* | (2006.01) | |
| *G01J 1/08* | (2006.01) | |
| *G01J 3/28* | (2006.01) | |
| *G01J 3/02* | (2006.01) | |
| *G01J 3/18* | (2006.01) | |

(52) U.S. Cl.
CPC . *G01J 1/44* (2013.01); *G01J 1/08* (2013.01); *G01J 3/0218* (2013.01); *G01J 3/0264* (2013.01); *G01J 3/28* (2013.01); *G01J 3/0208* (2013.01); *G01J 3/18* (2013.01); *G01J 2001/444* (2013.01)

(58) Field of Classification Search
CPC .... G01J 3/0264; G01J 3/28; G01J 1/08; G01J 3/0218; G01J 1/44

USPC .......................................................... 250/206
See application file for complete search history.

(56) References Cited

U.S. PATENT DOCUMENTS

| | | |
|---|---|---|
| 6,674,572 B1 | 1/2004 | Scheruebl et al. |
| 10,247,602 B2 * | 4/2019 | Marukawa ............. G01J 1/0411 |
| 2006/0146325 A1 | 7/2006 | Wachsmuth et al. |

(Continued)

FOREIGN PATENT DOCUMENTS

| | | |
|---|---|---|
| CN | 1598824 | 3/2005 |
| CN | 102866116 | 1/2013 |

(Continued)

OTHER PUBLICATIONS

"Office Action of Taiwan Counterpart Application," dated Aug. 9, 2018, with English translation thereof, p. 1-p. 6.

(Continued)

*Primary Examiner* — Georgia Y Epps
(74) *Attorney, Agent, or Firm* — JCIPRNET

(57) ABSTRACT

Disclosed is an optical measuring apparatus and an adapter for the optical measuring apparatus for easily managing calibration data in the optical measuring apparatus in which a sensor head and a controller are separated. The optical measuring apparatus includes the controller including a light projecting part, a light receiving part, and a control part; a head part including an optical system and a cable; and an adapter configured to be electrically or optically connectable to the cable of the head part and the controller and configured to be attachable to and detachable from the cable and the controller. The adapter includes a ROM configured to store calibration data for correcting the measurement value by the head part.

15 Claims, 15 Drawing Sheets

(56) References Cited

U.S. PATENT DOCUMENTS

| | | | |
|---|---|---|---|
| 2008/0151253 A1 | 6/2008 | Korner et al. | |
| 2010/0127638 A1* | 5/2010 | Lan .................. | H05B 33/0863 |
| | | | 315/294 |
| 2012/0063501 A1* | 3/2012 | Aguren .................. | H04L 43/50 |
| | | | 375/224 |
| 2019/0277621 A1* | 9/2019 | Okuda ............... | G01B 11/2441 |

FOREIGN PATENT DOCUMENTS

| | | | |
|---|---|---|---|
| CN | 103673887 | | 3/2014 |
| CN | 103988046 | | 8/2014 |
| EP | 1647799 | † | 4/2006 |
| JP | 2004125528 | | 4/2004 |
| JP | 4213599 | | 1/2009 |
| JP | 2012208102 | | 10/2012 |
| KR | 1020110070598 | | 6/2011 |
| KR | 101277306 | | 7/2013 |
| KR | 20140035795 | | 3/2014 |
| TW | I452256 | | 9/2014 |
| TW | I471520 | | 2/2015 |

OTHER PUBLICATIONS

Office Action of Korea Counterpart Application, with English translation thereof, dated Dec. 13, 2018, pp. 1-9.
Office Action of Korean Counterpart Application, with English translation thereof, dated Jun. 28, 2019, pp. 1-6.
"Office Action of China Counterpart Application," with English translation thereof, dated Oct. 14, 2019, pp. 1-24.

\* cited by examiner
† cited by third party

OPTICAL MEASURING APPARATUS AND ADAPTER FOR OPTICAL MEASURING APPARATUS

CROSS-REFERENCE TO RELATED APPLICATION

This application claims the priority benefit of Japanese Patent Application Laid-Open (JP-A) no. 2017-047078, filed on Mar. 13, 2017. The entirety of the above-mentioned patent applications is hereby incorporated by reference herein and made a part of this specification.

BACKGROUND

Technical Field

The disclosure relates to an optical measuring apparatus and an adapter for an optical measuring apparatus.

Description of Related Art

There is known an optical measuring apparatus in which a sensor head and a controller are separated from each other, and the sensor head and the controller are connected by an optical fiber. For example, Japanese Unexamined Patent Application Publication No. 2012-208102 discloses a confocal measuring apparatus which measures displacement of an object to be measured in a non-contact manner using a confocal optical system. This measuring apparatus has a head part, a controller part, and an optical fiber forming an optical path between the head part and the controller part.

Calibration of measurement values of the sensor head may be required for accurate measurement by the sensor. However, since the head part disclosed in Japanese Unexamined Patent Application Publication No. 2012-208102 does not have electronic components, the result of the calibration cannot be held. Meanwhile, when a memory for storing calibration data is managed separately from the sensor head, the management becomes complicated.

SUMMARY

An optical measuring apparatus according to one embodiment of the disclosure includes a controller including a light projecting part configured to generate irradiation light projected onto an object to be measured, a light receiving part configured to receive reflected light from the object to be measured, and a control part configured to calculate a measurement value based on a light receiving amount of the light receiving part; a sensor head including an optical system configured to project the irradiation light onto the object to be measured and to receive the reflected light from the object to be measured, and a cable configured to transmit the irradiation light from the light projecting part of the controller to the optical system and to transmit the reflected light from the optical system to the light receiving part of the controller; and an adapter configured to be electrically or optically connectable to the cable of the sensor head and the controller and configured to be attachable to and detachable from the cable and the controller. The adapter includes a memory configured to store calibration data for correcting the measurement value by the sensor head.

An adapter for an optical measuring apparatus according to one embodiment of the disclosure is an adapter which is configured to be electrically or optically connectable to a cable of a sensor head and a controller and configured to be attachable to and detachable from the cable and the controller. The controller may include a light projecting part configured to generate irradiation light projected onto an object to be measured, a light receiving part configured to receive reflected light from the object to be measured, and a control part configured to calculate a measurement value based on a light receiving amount of the light receiving part. The sensor head may include an optical system configured to project the irradiation light onto the object to be measured and to receive the reflected light from the object to be measured. The cable may be configured to transmit the irradiation light from the light projecting part of the controller to the optical system and configured to transmit the reflected light from the optical system to the light receiving part of the controller. The adapter may include a memory configured to store calibration data for correcting the measurement value by the sensor head.

DESCRIPTION OF THE EMBODIMENTS

Figure 1:
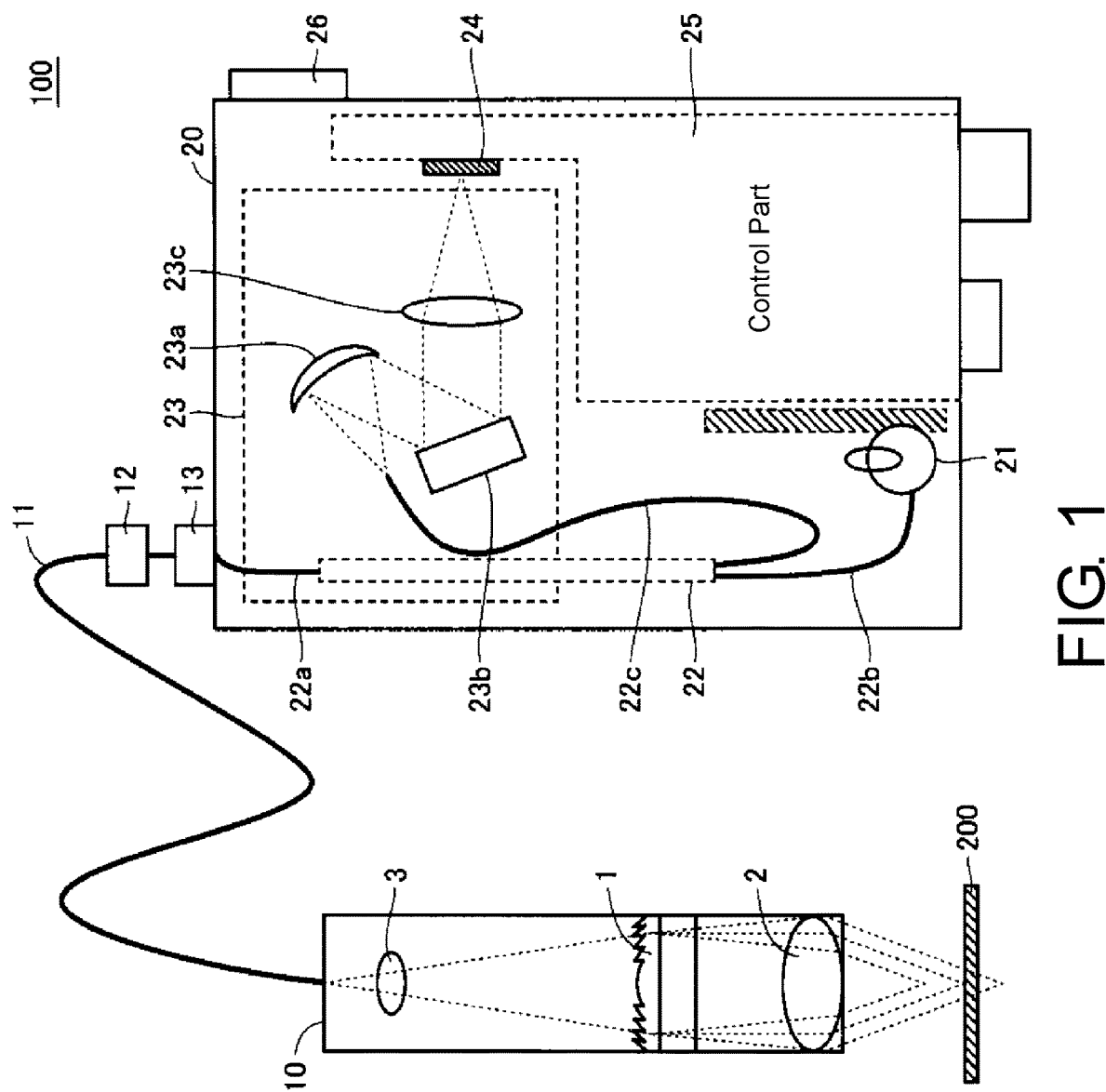
FIG. 1 is a schematic diagram illustrating an example of an optical measuring apparatus according to an embodiment of the disclosure.

The embodiment of the disclosure provides a means for easily managing calibration data in an optical measuring apparatus in which a sensor head and a controller are separated.

According to one embodiment of the disclosure, an optical measuring apparatus includes a controller including a light projecting part configured to generate irradiation light projected onto an object to be measured, a light receiving part configured to receive reflected light from the object to be measured, and a control part configured to calculate a measurement value based on a light receiving amount of the light receiving part; a sensor head including an optical system configured to project the irradiation light onto the object to be measured and to receive the reflected light from the object to be measured, and a cable configured to transmit the irradiation light from the light projecting part of the controller to the optical system and to transmit the reflected light from the optical system to the light receiving part of the controller; and an adapter configured to be electrically or optically connectable to the cable of the sensor head and the controller and configured to be attachable to and detachable from the cable and the controller. The adapter includes a memory configured to store calibration data for correcting the measurement value by the sensor head.

According to the above-described configuration, in the optical measuring apparatus in which the sensor head and the controller are separated, it is possible to easily manage the calibration data. The adapter is for connecting the sensor head and the controller. By embedding the memory (for example, a ROM) which stores the calibration data in the adapter, it is possible to manage the calibration data to be linked one-to-one with the sensor head.

The cable may be configured to be connectable to a first end of an extension cable. The optical measuring apparatus may further include an additional adapter configured to be connected together with the adapter between a second end of the extension cable and the controller. The additional adapter may include a memory configured to store data indicating a length of the extension cable.

According to the above-described configuration, even when an extending cable is connected, it is possible to manage the calibration data to be linked one-to-one with the sensor head. Further, a length of the cable can be recognized on the controller side.

The cable may include an optical fiber. The adapter may include an imaging part configured to take an image of an end surface of the optical fiber connected to the adapter and to output information on the image of the end surface to the control part of the controller.

According to the above-described configuration, by observing the end surface of the optical fiber, for example, the controller can recognize contamination on the end surface of the optical fiber.

The sensor head may include a light emitting part configured to emit light having a wavelength not used for measurement. The optical measuring apparatus may further include an attachment configured to be attachable to and detachable from the sensor head. The attachment may include a wireless transmission part configured to wirelessly supply electric power for driving the light emitting part to the light emitting part. The light emitting part may transmit an optical signal indicating identification information of the sensor head to the controller through the cable and the adapter. The light receiving part of the controller may photoelectrically convert the optical signal and may output an electric signal indicating the identification information to the control part.

According to the above-described configuration, it is possible for the controller to determine whether or not the head part and the calibration data correctly correspond with each other.

The adapter may include a wireless transmission part configured to transmit the calibration data stored in the memory to the controller by a wireless signal. The controller may include a data receiving part configured to receive the calibration data by receiving the wireless signal and to output the calibration data to the control part.

According to the above-described configuration, the configuration for connecting the adapter and the controller can be simplified.

The cable may include a connector to be connected to the adapter. An IC (Integrated Circuit) chip configured to hold unique information of the sensor head may be mounted in the connector.

According to the above-described configuration, since the controller can acquire the identification information of the sensor head, the controller can determine whether or not the head part and the calibration data correctly correspond with each other.

According to one embodiment of the disclosure, an adapter for an optical measuring apparatus is an adapter which is configured to be electrically or optically connectable to a cable of a sensor head and a controller and configured to be attachable to and detachable from the cable and the controller. The controller may include a light projecting part configured to generate irradiation light projected onto an object to be measured, a light receiving part configured to receive reflected light from the object to be measured, and a control part configured to calculate a measurement value based on a light receiving amount of the light receiving part. The sensor head may include an optical system configured to project the irradiation light onto the object to be measured and to receive the reflected light from the object to be measured. The cable may be configured to transmit the irradiation light from the light projecting part of the controller to the optical system and configured to transmit the reflected light from the optical system to the light receiving part of the controller. The adapter may include a memory configured to store calibration data for correcting the measurement value by the sensor head.

According to the above-described configuration, in the optical measuring apparatus in which the sensor head and the controller are separated, it is possible to easily manage the calibration data.

The cable may be configured to be connectable to a first end of an extension cable. The adapter may be connected together with an additional adapter between a second end of the extension cable and the controller. The additional adapter may include a memory configured to store data indicating a length of the extension cable.

According to the above-described configuration, even when the extending cable is connected, it is possible to manage the calibration data to be linked one-to-one with the sensor head. Further, the length of the cable can be recognized on the controller side.

The cable may include an optical fiber. The adapter may further include an imaging part configured to take an image of an end surface of the optical fiber connected to the adapter and to output information on the image of the end surface to the control part of the controller.

According to the above-described configuration, for example, the controller can recognize contamination on the end surface of the optical fiber by observing the end surface of the optical fiber.

The adapter may further include a wireless transmission part configured to transmit the calibration data stored in the memory to the controller by a wireless signal.

According to the above-described configuration, the configuration for connecting the adapter and the controller can be simplified.

According to the embodiments of the disclosure, in the optical measuring apparatus in which the sensor head and the controller are separated, it is possible to easily manage the calibration data.

Hereinafter, embodiments of the disclosure will be described in detail with reference to the drawings. Further, in the drawings, the same or common parts are denoted by the same reference numerals, and description thereof will not be repeated.

FIG. 1 is a schematic diagram illustrating an example of an optical measuring apparatus according to an embodiment of the disclosure. An optical measuring apparatus 100 illustrated in FIG. 1 measures displacement of an object 200 to be measured using a confocal optical system. The optical measuring apparatus 100 includes a head part (sensor head) 10, a cable 11 including an optical fiber, an optical fiber connector 12 (connector), an adapter 13, and a controller 20. In the embodiment of the disclosure, since the head part 10 is separated from the controller 20, the head part 10 may freely move with respect to the controller 20.

The head part 10 includes a diffractive lens 1, an objective lens 2, and a condensing lens 3. The diffractive lens 1 is an optical element which causes a chromatic aberration in the optical axis direction in light emitted from a light source which emits light having a plurality of wavelengths. The objective lens 2 is disposed closer to the object 200 to be measured than the diffractive lens 1. The objective lens 2 is an optical element which focuses light, in which the chromatic aberration occurs at the diffractive lens 1, on the object 200 to be measured.

The cable 11 is optically connected between the head part 10 and the controller 20. The optical fiber connector 12 is a connector for optically connecting the cable 11 to the adapter 13. The cable 11, the optical fiber connector 12 and the adapter 13 form an optical path between the head part 10 and the controller 20.

The controller 20 includes a light projecting part 21, a branched optical fiber 22, a spectroscopic control part 23, a light receiving part 24, a control part 25, and a display part 26. The light projecting part 21 includes a white light source as a light source for measurement. In one example, the white light source is a white LED (Light Emitting Diode). The light projecting part 21 may have a white light source different from the white LED.

The branched optical fiber 22 has an optical fiber 22a on a side connected to the cable 11 and optical fibers 22b and 22c on an opposite side. The optical fiber 22b is optically connected to the white LED 21, and the optical fiber 22c is optically connected to the spectroscopic control part 23. Therefore, the branched optical fiber 22 may guide the light emitted from the white LED 21 to the cable 11 and may guide the light returning from the head part 10 to the spectroscopic control part 23 via the cable 11.

The spectroscopic control part 23 includes a concave mirror 23a, a diffraction grating 23b, and a condensing lens 23c. The concave mirror 23a reflects the light returning from the head part 10. The light reflected by the concave mirror 23a is incident on the diffraction grating 23b. The condensing lens 23c collects the light emitted from the diffraction grating 23b.

The light receiving part 24 receives the light emitted from the spectroscopic control part 23 and measures an intensity of the light. The light receiving part 24 includes an imaging device such as a line complementary metal oxide semiconductor (CMOS) or a line charge coupled device (CCD). The imaging device outputs a signal (electric signal) indicating the intensity of the light incident on the imaging device to the control part 25.

The spectroscopic control part 23 and the light receiving part 24 form a measuring part which measures the intensity of the light returning from the head part 10 with respect to each of the wavelengths. The measuring part may be configured with a single imaging device such as a CCD. The imaging device may be a two-dimensional CMOS or a two-dimensional CCD.

The control part 25 is a circuit which comprehensively controls the optical measuring apparatus 100. For example, the control part 25 is configured with a circuit including a central processing unit (CPU).

A focal position of the light projected from the head part 10 differs in each of the wavelengths. Only light having a wavelength of the wavelengths reflected on a surface of the object 200 to be measured which is focused on the object 200 to be measured is incident again on an end surface of a confocal optical fiber in the head part 10. Therefore, the wavelength of the light returning from the head part 10 serves as information related to a position of the object 200 to be measured.

The cable 11 transmits the irradiation light from the light projecting part of the controller 20 to an optical system of the head part 10. Meanwhile, the cable 11 transmits the reflected light from the object 200 to be measured from the optical system of the head part 10 to the light receiving part of the controller 20. The light returning from the head part 10 is incident on the light receiving part 24 via the cable 11, the optical fiber connector 12, the adapter 13, and the spectroscopic control part 23.

The spectroscopic control part 23 changes a light receiving position of the light receiving part 24 in the imaging device according to the wavelength of the light incident on the spectroscopic control part 23. The control part 25 converts information on the light receiving position of the imaging device into information on a position of the object 200 to be measured.

The control part 25 corrects the information on the position of the object 200 to be measured, that is, the data from the light receiving part 24, using calibration data. The control part 25 transmits the corrected data to the display part 26. The display part 26 displays the corrected data as a measurement value of the optical measuring apparatus 100.

Figure 2:
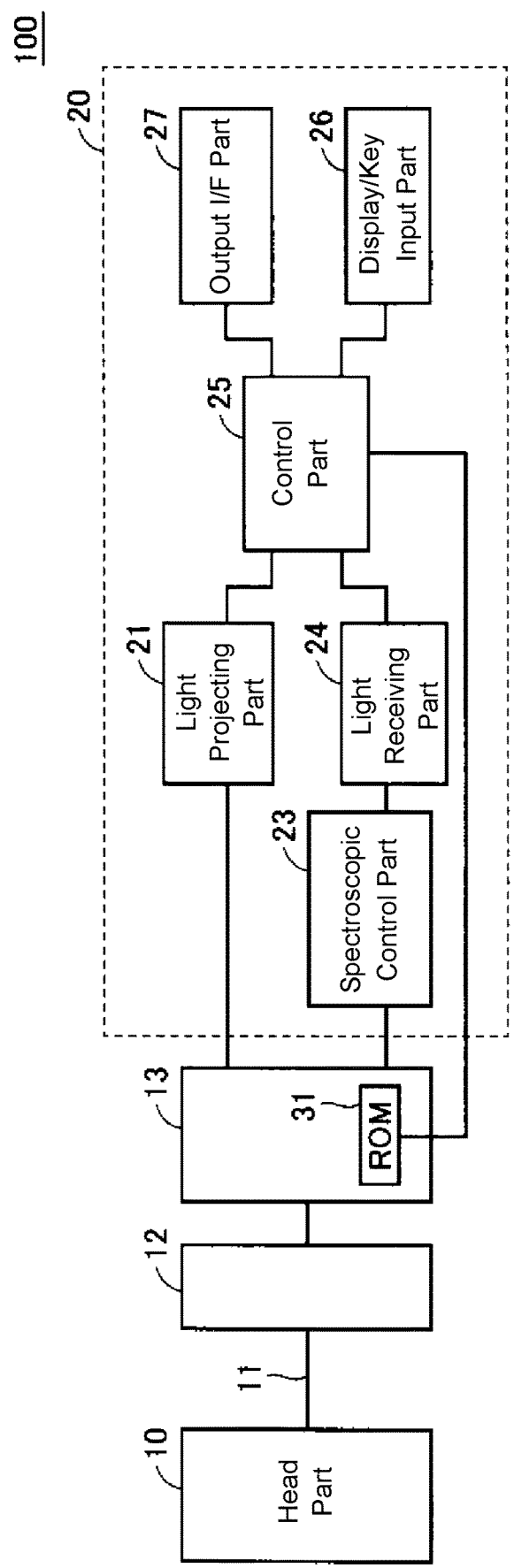
FIG. 2 is a circuit block diagram illustrating a configuration of the optical measuring apparatus illustrated in FIG. 1.

FIG. 2 is a block diagram illustrating a configuration of the optical measuring apparatus illustrated in FIG. 1. As illustrated in FIG. 2, the controller 20 may include an output I/F (interface) part 27 which outputs a processing result of the control part 25 to an outside of the controller 20. Likewise, the controller 20 may include a key input part through which a user inputs information to the control part 25. In FIG. 2, the display part 26 and the key input part are combined and illustrated as a "display/key input part 26."

The optical fiber connector 12 is a part of the cable 11. The optical fiber connector 12 is attachable to and detachable from the adapter 13. The adapter 13 is attachable to and detachable from the controller 20. That is, the adapter 13 is configured to be electrically or optically connectable to the cable 11 of the head part 10 and the controller 20, and is attachable to and detachable from the cable 11 and the controller 20.

A ROM (Read Only Memory) 31 is built in the adapter 13. The ROM 31 stores the calibration data for correcting the measurement value by the head part 10. For example, in an inspection process before shipment of the optical measuring apparatus 100, the calibration data is recorded in the ROM 31. The calibration data stored in the ROM 31 is linked one-to-one with the head part 10.

For example, the calibration data is a coefficient multiplied by the measurement value of the head part 10. The control part 25 reads the calibration data from the ROM 31 and corrects the data (raw measurement value) from the light receiving part 24. This enables the measurement with high accuracy.

The control part 25 may verify whether or not the calibration data is stored in the ROM 31. When the calibration data is not stored in the ROM 31, the control part 25 may display an error on the display part 26.

Figure 3:
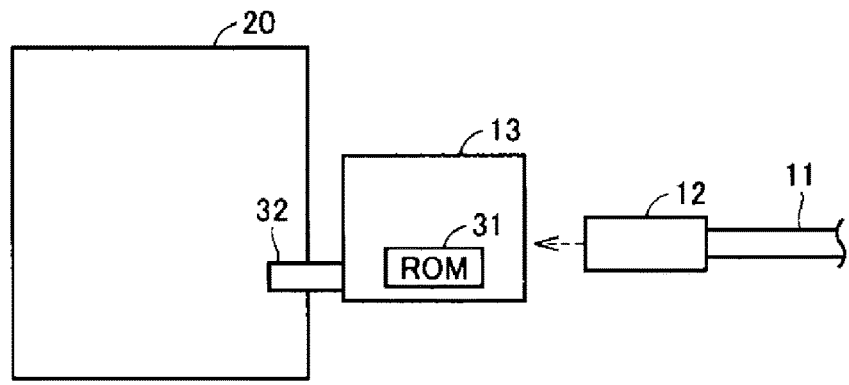
FIG. 3 is a schematic diagram illustrating connection among an optical fiber connector, an adapter having a built-in ROM, and a controller.

FIG. 3 is a schematic diagram illustrating connection among the optical fiber connector 12, the adapter 13 having the built-in ROM, and the controller 20. As illustrated in FIG. 3, the adapter 13 has a connector 32, and the connector 32 optically and electrically connects the adapter 13 with the controller 20. When the optical fiber connector 12 is optically connected to the adapter 13, the cable 11 is optically connected to the controller 20 via the adapter 13.

In the embodiment of the disclosure, the adapter 13 is necessary for electrically or optically connecting the cable 11 of the head part 10 to the controller 20. The ROM 31 built in the adapter 13 stores the calibration data linked with the head part 10. Therefore, it is possible to easily manage the calibration data for correcting the measurement value of the head part 10. Further, the configuration for connecting the adapter 13 and the controller 20 may be further simplified. These features will be described in detail below by comparison with other examples.

Figure 4:
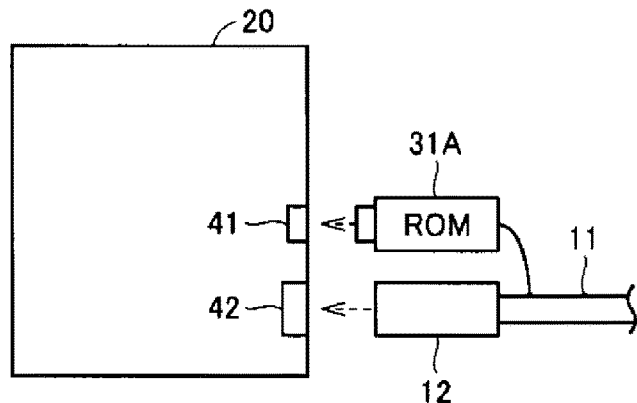
FIG. 4 is a schematic diagram illustrating another example of management of calibration data.

FIG. 4 is a schematic diagram illustrating another example of management of calibration data. As illustrated in FIG. 4, A ROM 31A and the optical fiber connector 12 may be independently connected to the controller 20. The controller 20 has a connector 41 for connecting the ROM 31A with the controller 20 and a connector 42 for connecting the optical fiber connector 12 with the controller 20. According to such a configuration, the optical fiber connector 12 is connected to the controller 20, and there is also a possibility that the user may lose the ROM 31A, or the user may forget to connect the ROM 31A to the controller 20.

As illustrated in FIG. 4, the ROM 31A is connected to the cable 11 by means of, for example, a strap or the like so that the head part and the ROM are always linked with each other. On the other hand, according to the embodiment of the disclosure, an adapter 13 having the built-in ROM 31 is necessary to connect the head part 10 to the controller 20. Therefore, such a problem can be solved.

Figure 5:
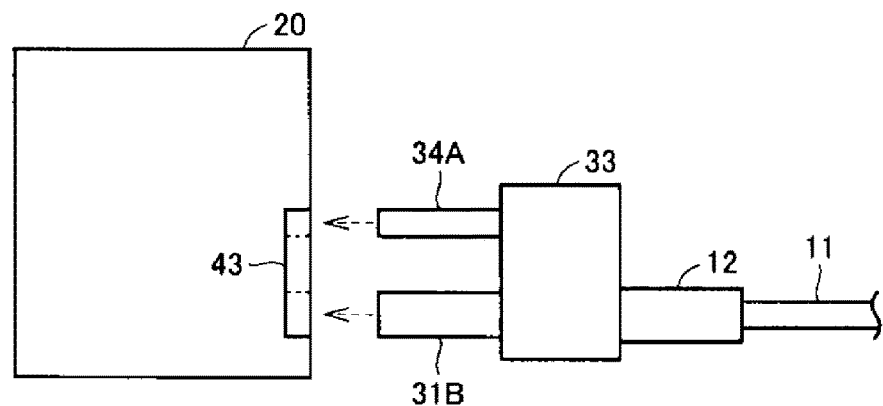
FIG. 5 is a schematic diagram illustrating yet another example of the management of the calibration data.

FIG. 5 is a schematic diagram illustrating yet another example of the management of the calibration data. As illustrated in FIG. 5, a ROM 31B and an optical fiber connector 34A are accommodated in the same housing 33. Accordingly, it is considered possible to solve the problem in the configuration illustrated in FIG. 4. However, a size of the connector 43 mounted on the controller 20 is likely to be larger than that of the connector 41 or the connector 42 illustrated in FIG. 4. In this regard, according to the embodiment of the disclosure, the optical fiber connector 12 and the adapter 13 are connected in series to the controller 20. Therefore, it is possible to solve the problem that the size of the connector on the controller 20 side becomes large.

There is a possibility of a distance between the head part 10 and the controller 20 becoming long according to an installation environment of the optical measuring apparatus 100. In such a case, it is necessary to extend a length of the fiber.

Figure 6:
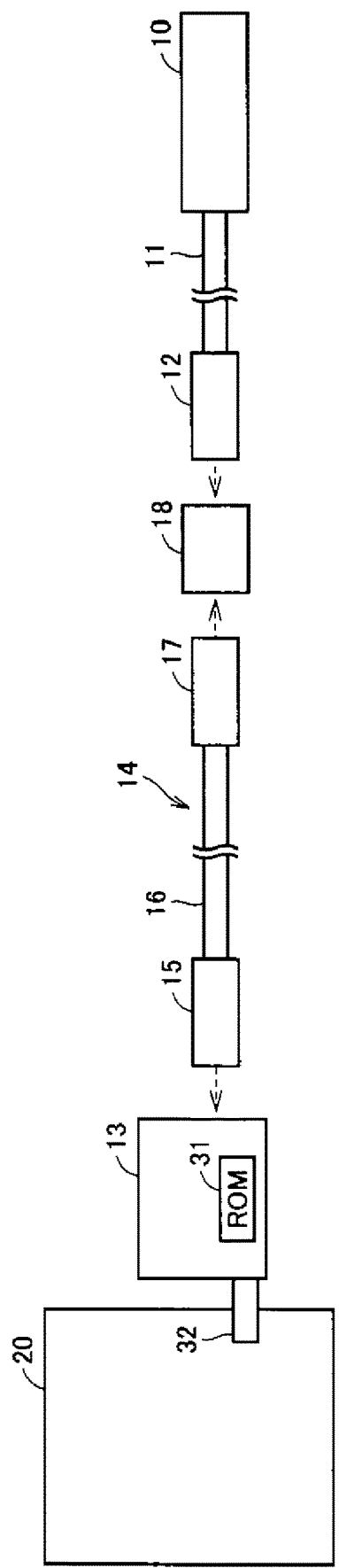
FIG. 6 is a diagram illustrating a configuration using an extending fiber according to the embodiment of the disclosure.

FIG. 6 is a diagram illustrating a configuration using an extending fiber according to the embodiment of the disclosure. As illustrated in FIG. 6, in the embodiment of the disclosure, a length of the fiber may extend using an extension cable 14. The extension cable 14 includes a cable main body 16 and optical fiber connectors 15 and 17 which are respectively provided at one end and the other end of the cable main body 16. Each of the optical fiber connectors 15 and 17 is configured to be attachable to and detachable from the adapter 13 and configured to be connectable to a cable extension connector 18. As illustrated in FIG. 6, for example, the optical fiber connector 12 and the optical fiber connector 17 of the extension cable 14 are connected by the cable extension connector 18, and the optical fiber connector 15 of the extension cable 14 is connected to the adapter 13.

It is preferable that the control part 25 (refer to FIGS. 1 and 2) of the controller 20 know a length of the extending fiber for accurate measurement. Therefore, when the extension cable 14 is used, first, the cable 11 and the extension cable 14 are connected by the cable extension connector 18 in a state in which the adapter 13 is separated from the controller 20, and the optical fiber connector 15 of the extension cable 14 is connected to the adapter 13. Next, the adapter 13 is connected to the controller 20.

Figure 7:
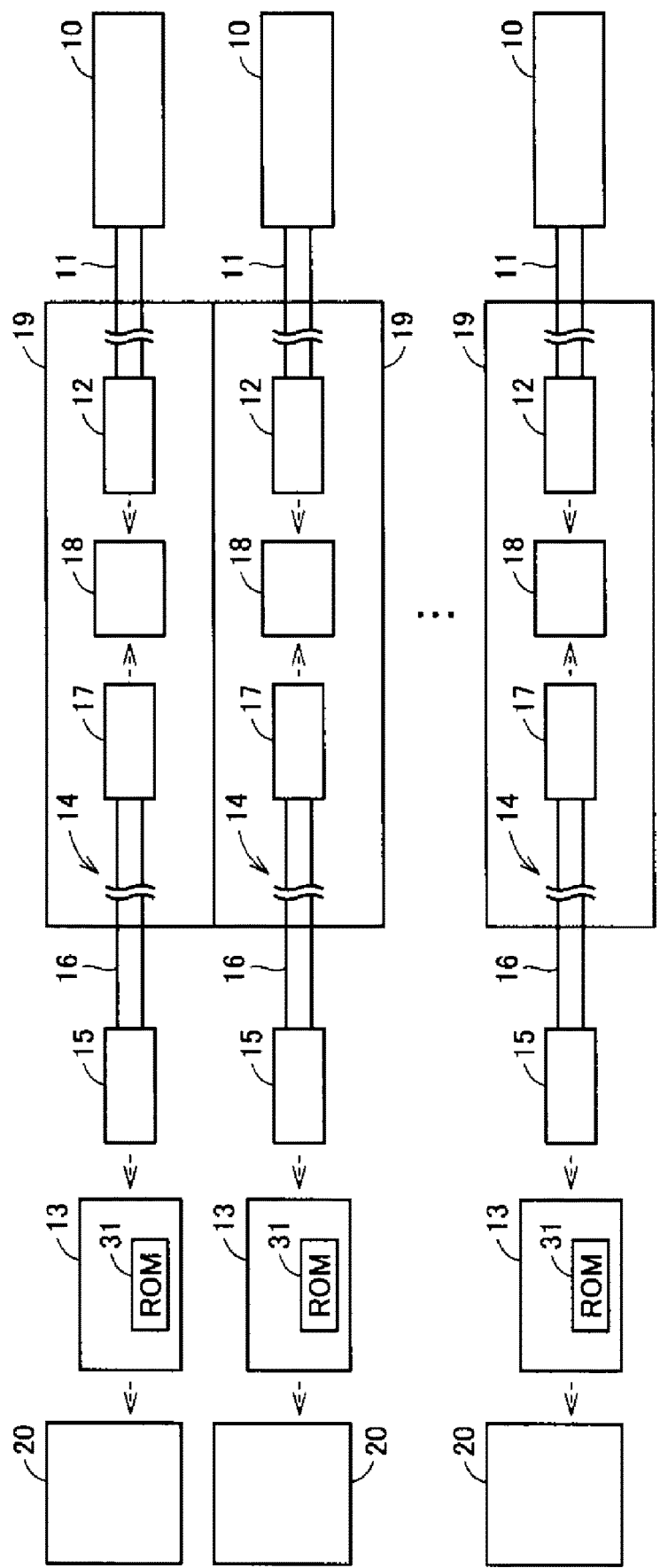
FIG. 7 is a diagram illustrating a configuration using a plurality of extending fibers according to the embodiment of the disclosure.

FIG. 7 is a diagram illustrating a configuration using a plurality of extending fibers according to the embodiment of the disclosure. As illustrated in FIG. 7, the cable 11 (and the optical fiber connector 12), the cable extension connector 18 and the extension cable 14 have a size capable of passing through a pipe 19.

Figure 8:
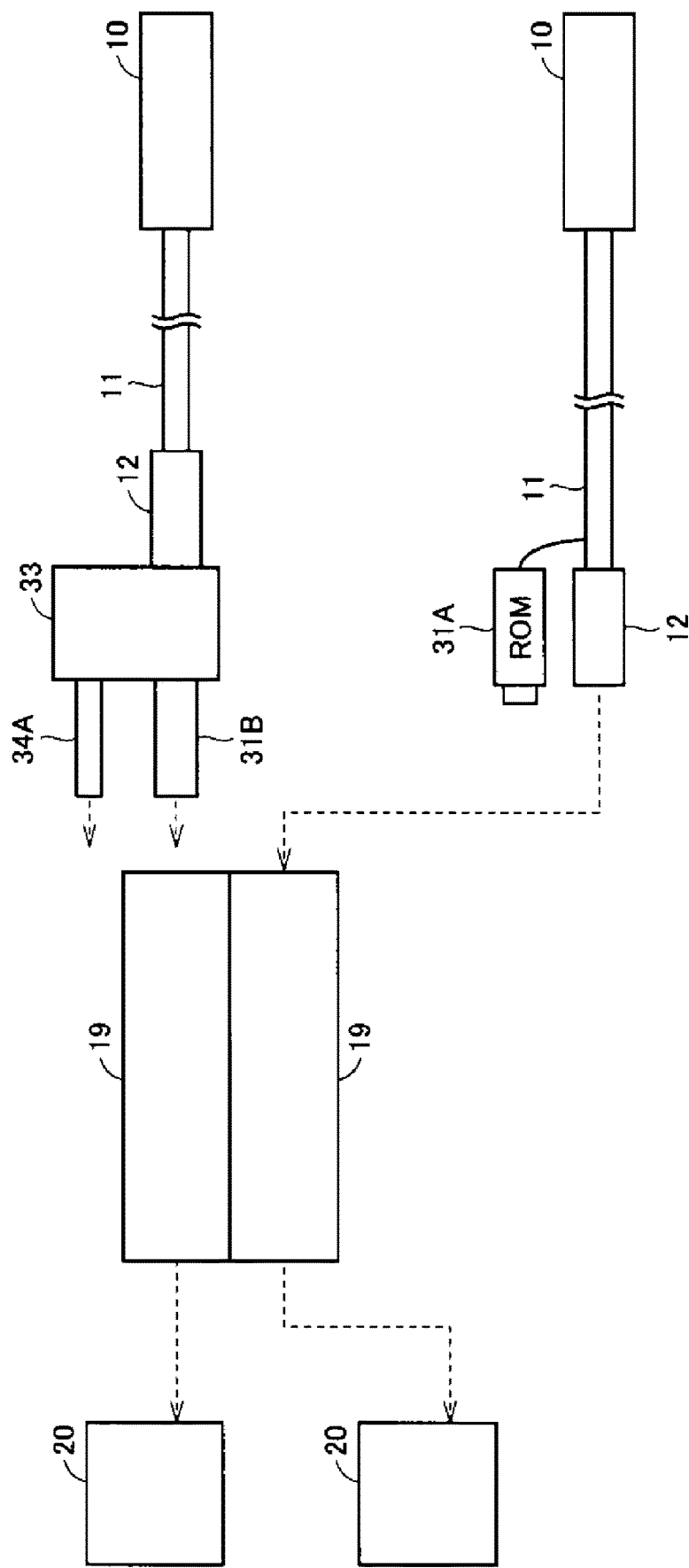
FIG. 8 is a schematic diagram illustrating a problem in a case in which a plurality of fibers pass through a pipe using another configuration for linking a head part and the ROM.

FIG. 8 is a schematic diagram illustrating a problem in a case in which a plurality of fibers pass through a pipe using another configuration for linking the head part and the ROM. As illustrated in FIG. 8, for example, a connector (refer to FIG. 5) in which the ROM 31B and the optical fiber connector 34A are accommodated in the same housing 33 is used. However, there is a possibility that the size of the connector may become too large to pass through the pipe 19. Further, the extension cable may not be connected to the connector illustrated in FIG. 8.

In another example, for example, the ROM 31A and the optical fiber connector 12 are configured to be independently connectable to the controller 20 (refer to FIG. 4). However, it is difficult for both of the optical fiber connector 12 and the ROM 31A to pass through the pipe 19 while the ROM 31A is connected to the cable 11 by a strap or the like.

After the ROM 31A is separated from the cable 11, it is conceivable that the cable 11 passes through the pipe 19. After the cable 11 passes through the pipe 19, the ROM 31A may be connected to the cable 11 with a strap or the like. However, by separating the ROM 31A from the cable 11, there is a possibility that the ROM 31A may be lost or the user may forget to connect the ROM 31A to the controller 20.

As illustrated in FIG. 7, according to the embodiment of the disclosure, each of the plurality of head parts 10 may be linked with the ROM 31 of the corresponding adapter 13. Further, even when the extension cable 14 is connected to the cable 11 via the cable extension connector 18 to extend the optical fiber from the head part 10, the extending cable 11 may pass through the pipe. Therefore, it is possible not only to extend the distance between the controller 20 and the head part 10 but also to protect the cable.

When the optical fiber extends, for example, an extension cable having an appropriate length may be selected from a plurality of types of extension cables having different lengths. The control part 25 of the controller 20 changes an upper limit value of an exposure time according to the length of the extension cable. Therefore, the control part 25 needs to know the length of the optical fiber.

The user may input the length of the extension cable to the controller 20 in order for the control part 25 to acquire information on the length of the extension cable. However, this makes a user's work complicated. Therefore, it is preferable that the control part 25 be capable of automatically recognizing the length of the extension cable.

Figure 9:
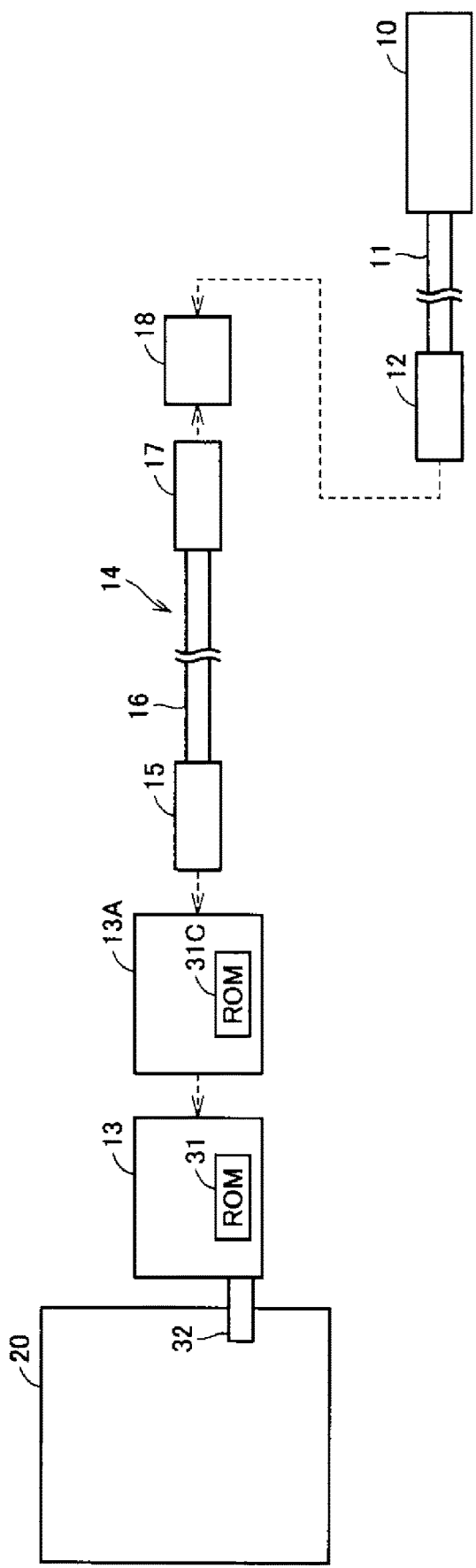
FIG. 9 is a diagram illustrating an example of a configuration for allowing a control part of the controller to recognize a length of the extension cable.

FIG. 9 is a diagram illustrating an example of a configuration for allowing the control part 25 of the controller 20 to recognize the length of the extension cable. As illustrated in FIG. 9, the optical fiber connector 15 of the extension cable 14 is connected to an additional adapter 13A. A ROM 31C is built in the adapter 13A. The ROM 31C stores information on the length of the extension cable 14. For example, before the shipment of the extension cable 14, the information on the length of the extension cable 14 is recorded in the ROM 31C. When the extension cable 14 is shipped, it is easy to use the adapter 13A and the extension cable 14 simultaneously by enclosing the extension cable 14 and the adapter 13A together.

Further, in the embodiment of the disclosure, various modified examples are possible on the premise that the adapter 13 has the ROM 31 for storing the calibration data. Hereinafter, other embodiments of the disclosure will be described.

Figure 10:
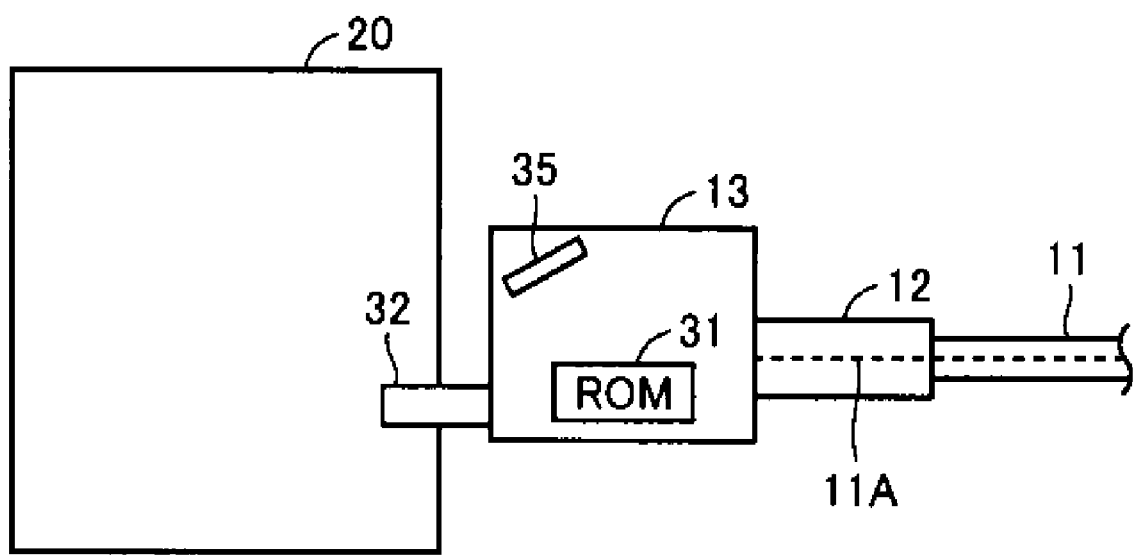
FIG. 10 is a diagram illustrating an additional configuration of the adapter according to the embodiment of the disclosure.
Figure 11:
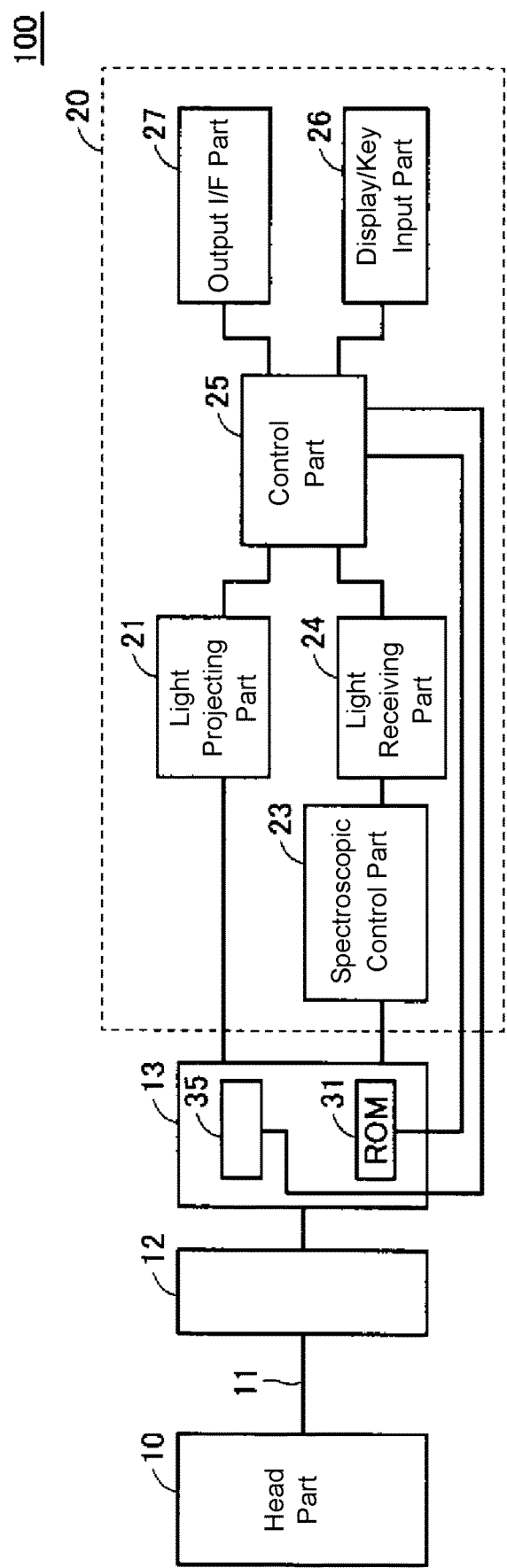
FIG. 11 is a circuit block diagram of an optical measuring apparatus including the adapter illustrated in FIG. 10.

FIG. 10 is a diagram illustrating an additional configuration of the adapter 13 according to the embodiment of the disclosure. FIG. 11 is a block diagram of an optical measuring apparatus 100 including the adapter 13 illustrated in FIG. 10. Referring to FIGS. 10 and 11, the adapter 13 includes an imaging part 35 in addition to the ROM 31 and the connector 32. The imaging part 35 takes an image of an end surface of an optical fiber 11A (refer to FIG. 10) of the cable 11 exposed through the optical fiber connector 12. Further, when the cable 11 and the cable main body 16 of the extension cable 14 are connected to each other, the imaging part 35 may observe the end surface of the optical fiber of the cable main body 16.

The connector 32 (refer to FIG. 10) is configured to transmit the electric signal generated by the adapter 13 to the controller 20. Image information generated by the imaging part 35 is transmitted to the control part 25 of the controller 20 through the connector 32.

According to the configuration illustrated in FIGS. 10 and 11, contamination on the end surface of the optical fiber may be recognized by observing the end surface of the optical fiber. The control part 25 may cause the display part 26 to display an error when the end surface of the optical fiber is contaminated.

Figure 12:
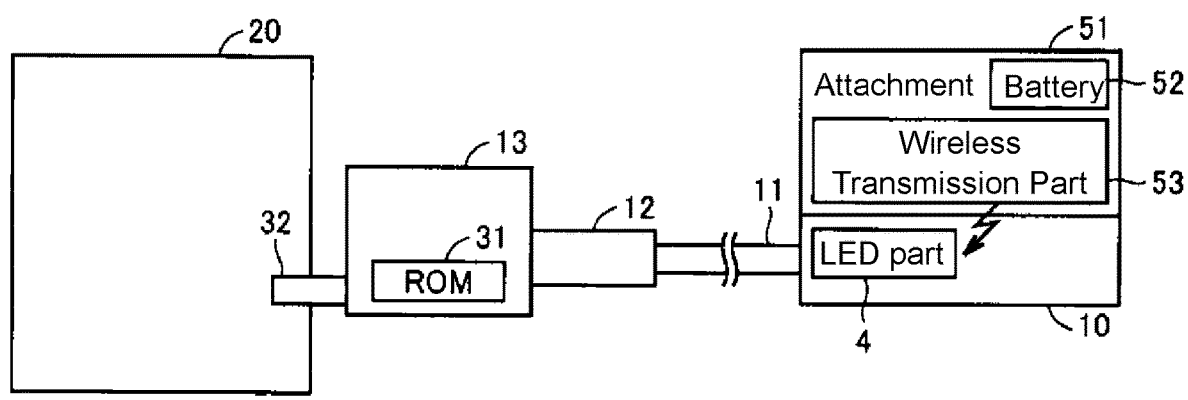
FIG. 12 is a diagram illustrating an additional configuration of the optical measuring apparatus according to the embodiment of the disclosure.
Figure 13:
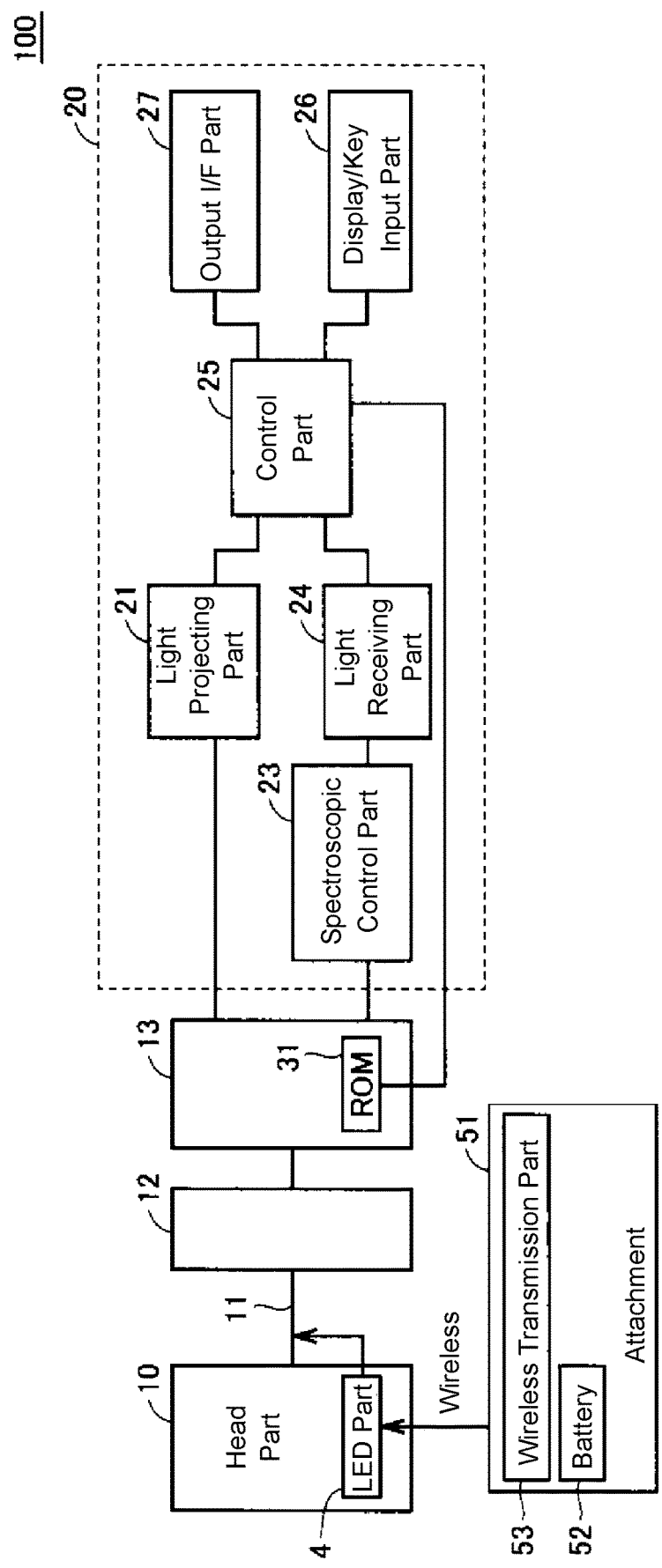
FIG. 13 is a circuit block diagram of the optical measuring apparatus illustrated in FIG. 12.

FIG. 12 is a diagram illustrating an additional configuration of the optical measuring apparatus 100 according to the embodiment of the disclosure. FIG. 13 is a block diagram of the optical measuring apparatus 100 illustrated in FIG. 12. Referring to FIGS. 12 and 13, the optical measuring apparatus 100 further includes an attachment 51 which is attachable to and detachable from the head part 10. The attachment 51 includes a battery 52 and a wireless transmission part 53.

The head part 10 includes an LED part (light emitting part) 4. The LED part 4 includes an LED and a driving circuit (none of which are illustrated).

When the attachment 51 is attached to the head part 10, the wireless transmission part 53 is driven by the battery 52. The wireless transmission part 53 supplies electric power for driving the LED part 4 to the LED part 4 wirelessly. The LED part 4 generates light by receiving radio waves from the wireless transmission part 53. An emission wavelength of the LED part 4 is a wavelength which is not used for the measurement by the optical measuring apparatus 100.

The LED part 4 generates an optical signal indicating a serial number of the head part 10. The serial number corresponds to identification information of the head part 10. The optical signal is transmitted to the controller 20 through the cable 11 and the adapter 13.

The light receiving part 24 photoelectrically converts the optical signal and generates an electric signal indicating the serial number (identification information). The control part 25 receives the electric signal from the light receiving part 24 and acquires the serial number of the head part 10. Therefore, the control part 25 may identify the head part 10.

Figure 14:
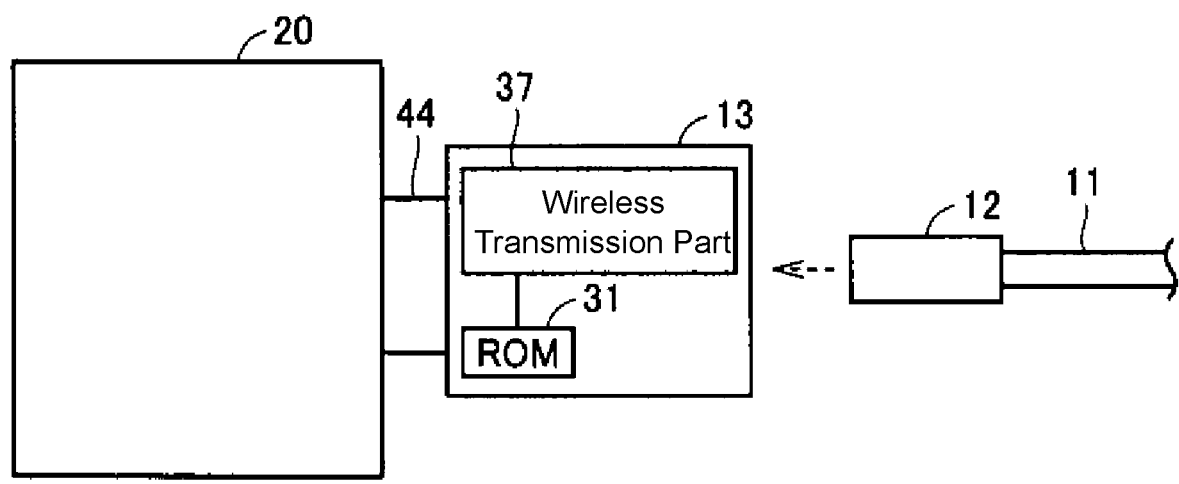
FIG. 14 is a diagram illustrating another configuration of the adapter according to the embodiment of the disclosure.
Figure 15:
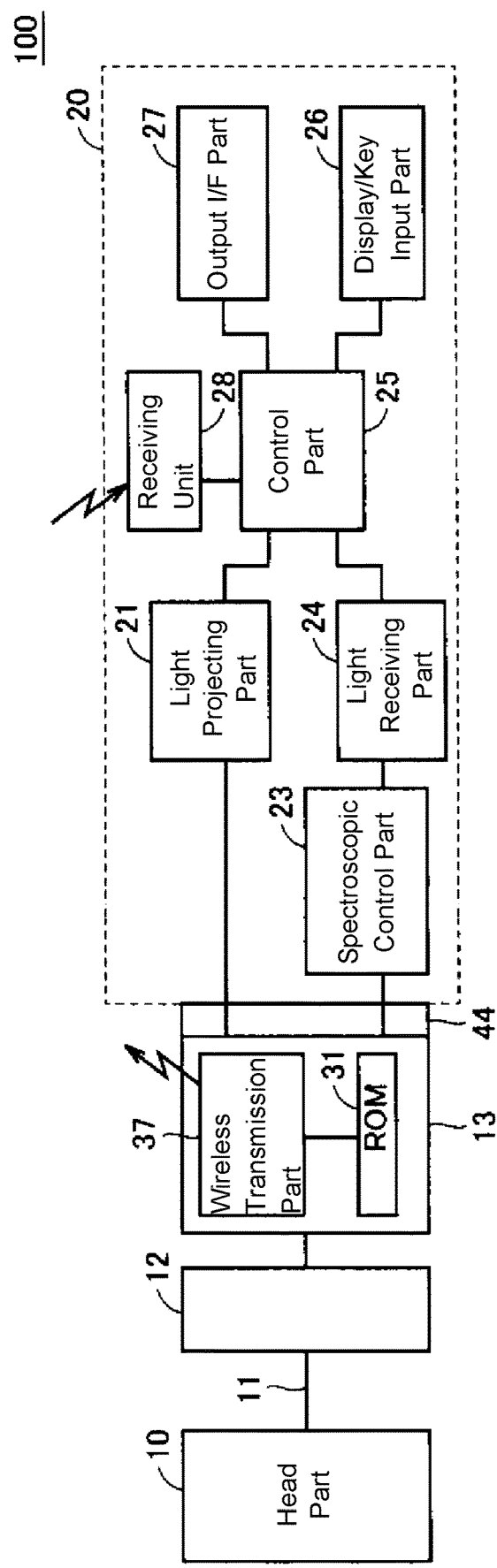
FIG. 15 is a circuit block diagram of an optical measuring apparatus including the adapter illustrated in FIG. 14.

FIG. 14 is a diagram illustrating another configuration of the adapter 13 according to the embodiment of the disclosure. FIG. 15 is a block diagram of an optical measuring apparatus 100 including the adapter 13 illustrated in FIG. 14. Referring to FIGS. 14 and 15, the adapter 13 includes a connector 44 instead of the connector 32. The adapter 13 further includes a wireless transmission part 37. The controller 20 further includes a receiving unit 28 (data receiving part).

The wireless transmission part 37 reads the calibration data from the ROM 31 and transmits the calibration data to the controller 20 by a wireless signal. The receiving unit 28 receives a wireless signal from the wireless transmission part 37. The receiving unit 28 is connected to the control part 25 and receives the calibration data by receiving the wireless signal. The receiving unit 28 outputs the received calibration data to the control part 25.

According to the embodiment, the connector 44 has a configuration in which the configuration for electrical connection between the ROM 31 and the controller 20 is omitted from the connector 32. Therefore, the adapter 13 may be miniaturized, and the configuration for connecting the adapter 13 and the controller 20 may be simplified.

When a plurality of head parts 10 are connected to a plurality of controllers 20, there is a possibility that the head part 10 and the adapter 13 may not be correctly linked with each other. That is, the calibration data stored in the ROM 31 of an adapter 13 is not data for the head part 10 connected to the adapter 13. In such a case, although the optical measuring apparatus can perform the measurement, the measurement value includes an error. Therefore, it is preferable to confirm that the head part 10 and the adapter 13 are correctly linked with each other.

Figure 16:
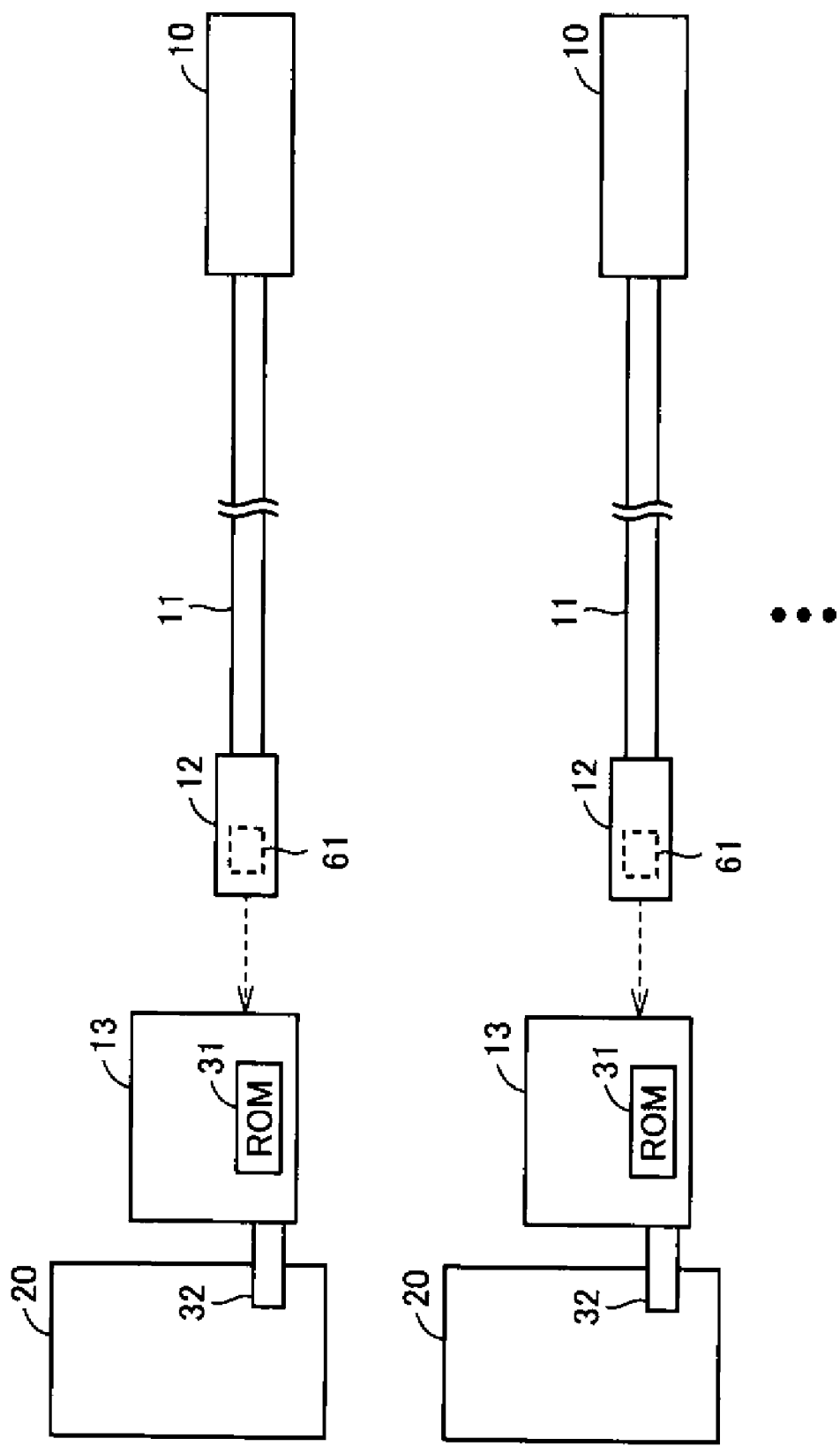
FIG. 16 is a schematic diagram illustrating a configuration for collating a correspondence relationship between the head part and the adapter.
Figure 17:
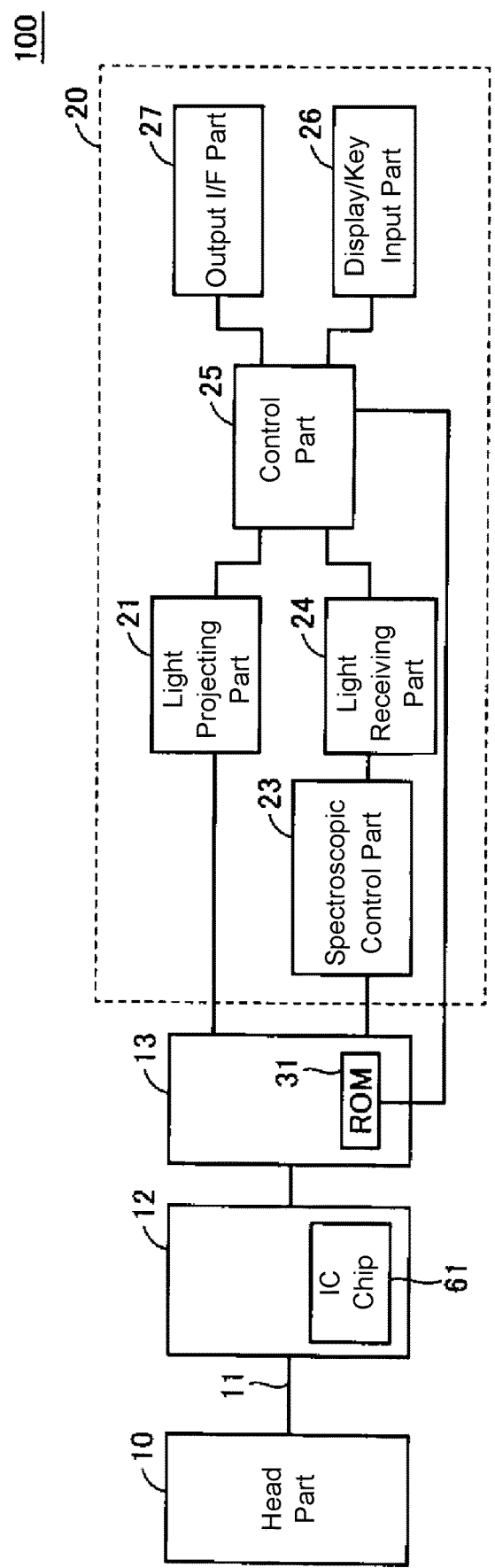
FIG. 17 is a circuit block diagram of an optical measuring apparatus including the adapter illustrated in FIG. 16.

FIG. 16 is a schematic diagram illustrating a configuration for collating a correspondence relationship between the head part 10 and the adapter 13. FIG. 17 is a block diagram of an optical measuring apparatus 100 including the adapter 13 illustrated in FIG. 16. As illustrated in FIGS. 16 and 17, an IC (Integrated Circuit) chip 61 is mounted in the optical fiber connector 12. The IC chip 61 holds unique information of the head part 10. The ROM 31 holds the unique information of the head part 10 to be connected to the adapter 13. The "unique information" is, for example, the serial number of the head part 10.

For example, in a state in which the optical fiber connector 12 is connected to the adapter 13, the serial number is read from the IC chip 61. Further, the serial number is read from the ROM 31. The serial numbers are transmitted to the controller 20. The control part 25 of the controller 20 compares the two serial numbers. When the two serial numbers are different from each other, the control part 25 displays a collation error on the display part (display/key input part 26). Thus, the user can confirm whether or not the correct head part 10 is connected to the adapter 13.

A method for transmitting the serial number from the IC chip 61 to the control part 25 of the controller 20 is not particularly limited. For example, the serial number may be transmitted from the IC chip 61 to the control part 25 via the connector 32 (refer to FIG. 16) of the adapter 13. Alternatively, the serial number may be transmitted from the IC chip 61 to the control part 25 using the wireless transmission part 37 illustrated in FIG. 14.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical measuring apparatus comprising:
a controller comprising a light projecting part configured to generate irradiation light projected onto an object to be measured, a light receiving part configured to receive reflected light from the object to be measured, and a control part configured to calculate a measurement value based on a light receiving amount of the light receiving part;
a sensor head comprising an optical system configured to project the irradiation light onto the object to be measured and to receive the reflected light from the object to be measured, and a cable configured to transmit the irradiation light from the light projecting part of the controller to the optical system and to transmit the reflected light from the optical system to the light receiving part of the controller; and
an adapter configured to be electrically or optically connectable to the cable of the sensor head and the controller and configured to be attachable to and detachable from the cable and the controller,
wherein the adapter comprises a memory configured to store calibration data for correcting the measurement value by the sensor head, wherein
the sensor head comprises a light emitting part configured to emit light having a wavelength not used for measurement,
the optical measuring apparatus further comprises an attachment configured to be attachable to and detachable from the sensor head,
the attachment comprises a wireless transmission part configured to wirelessly supply electric power for driving the light emitting part to the light emitting part,
the light emitting part transmits an optical signal indicating identification information of the sensor head to the controller through the cable and the adapter, and the light receiving part of the controller photoelectrically converts the optical signal and outputs an electric signal indicating the identification information to the control part.

2. The optical measuring apparatus according to claim 1, wherein
the cable is configured to be connectable to a first end of an extension cable,
the optical measuring apparatus further comprises an additional adapter configured to be connected together with the adapter between a second end of the extension cable and the controller, and
the additional adapter comprises a memory configured to store data indicating a length of the extension cable.

3. The optical measuring apparatus according to claim 2, wherein
the adapter comprises a wireless transmission part configured to transmit the calibration data stored in the memory of the adapter to the controller by a wireless signal, and
the controller comprises a data receiving part configured to receive the calibration data by receiving the wireless signal and to output the calibration data to the control part.

4. The optical measuring apparatus according to claim 2, wherein
the cable comprises a connector to be connected to the adapter, and
an IC chip configured to hold unique information of the sensor head is mounted in the connector.

5. The optical measuring apparatus according to claim 1, wherein
the cable comprises an optical fiber, and
the adapter comprises an imaging part configured to take an image of an end surface of the optical fiber connected to the adapter and to output information on the image of the end surface to the control part of the controller.

6. The optical measuring apparatus according to claim 5, wherein
the adapter comprises a wireless transmission part configured to transmit the calibration data stored in the memory to the controller by a wireless signal, and
the controller comprises a data receiving part configured to receive the calibration data by receiving the wireless signal and to output the calibration data to the control part.

7. The optical measuring apparatus according to claim 5, wherein
the cable comprises a connector to be connected to the adapter, and
an IC chip configured to hold unique information of the sensor head is mounted in the connector.

8. The optical measuring apparatus according to claim 1, wherein
the adapter comprises a wireless transmission part configured to transmit the calibration data stored in the memory to the controller by a wireless signal, and
the controller comprises a data receiving part configured to receive the calibration data by receiving the wireless signal and to output the calibration data to the control part.

9. The optical measuring apparatus according to claim 1, wherein
the cable comprises a connector to be connected to the adapter, and
an IC chip configured to hold unique information of the sensor head is mounted in the connector.

10. An adapter of an optical measuring apparatus, which is configured to be electrically or optically connectable to a cable of a sensor head and a controller and configured to be attachable to and detachable from the cable and the controller, wherein the controller comprises a light projecting part configured to generate irradiation light projected onto an object to be measured, a light receiving part configured to receive reflected light from the object to be measured, and a control part configured to calculate a measurement value based on a light receiving amount of the light receiving part, the sensor head comprises an optical system configured to project the irradiation light onto the object to be measured and to receive the reflected light from the object to be measured, the cable is configured to transmit the irradiation light from the light projecting part of the controller to the optical system and configured to transmit the reflected light from the optical system to the light receiving part of the controller, and the adapter comprises a memory configured to store calibration data for correcting the measurement value by the sensor head, wherein the sensor head comprises a light emitting part configured to emit light having a wavelength not used for measurement, the optical measuring apparatus further comprises an attachment configured to be attachable to and detachable from the sensor head, the attachment comprises a wireless transmission part configured to wirelessly supply electric power for driving the light emitting part to the light emitting part, the light emitting part transmits an optical signal indicating identification information of the sensor head to the controller through the cable and the adapter, and the light receiving part of the controller photoelectrically converts the optical signal and outputs an electric signal indicating the identification information to the control part.

11. The adapter according to claim 10, wherein the cable is configured to be connectable to a first end of an extension cable, the adapter is connected together with an additional adapter between a second end of the extension cable and the controller, and the additional adapter comprises a memory configured to store data indicating a length of the extension cable.

12. The adapter according to claim 11, wherein the adapter further comprises a wireless transmission part configured to transmit the calibration data stored in the memory of the adapter to the controller by a wireless signal.

13. The adapter according to claim 10, wherein the cable comprises an optical fiber, and the adapter further comprises an imaging part configured to take an image of an end surface of the optical fiber connected to the adapter and to output information on the image of the end surface to the control part of the controller.

14. The adapter according to claim 13, wherein the adapter further comprises a wireless transmission part configured to transmit the calibration data stored in the memory to the controller by a wireless signal.

15. The adapter according to claim 10, wherein the adapter further comprises a wireless transmission part configured to transmit the calibration data stored in the memory to the controller by a wireless signal.

* * * * *